C. F. Woodruff,
Windlass Water Elevator,
N° 82,264.    Patented Sep. 15, 1868.
Fig: 1.
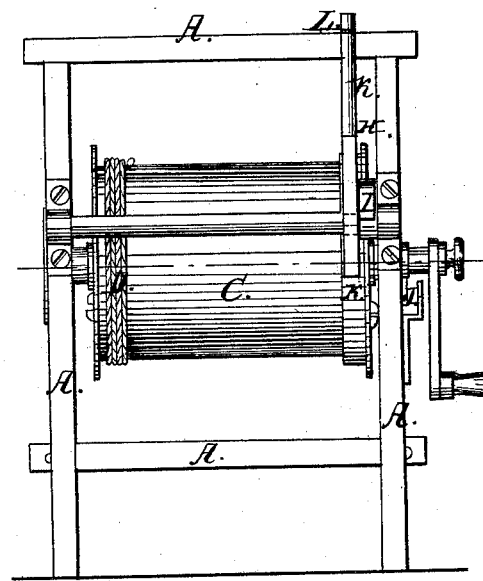
Fig: 2.
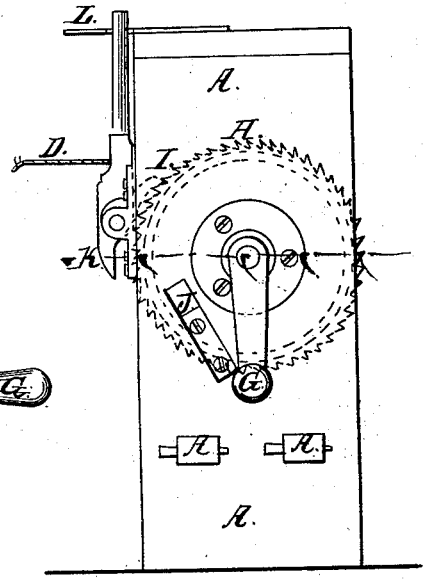
Fig: 3.
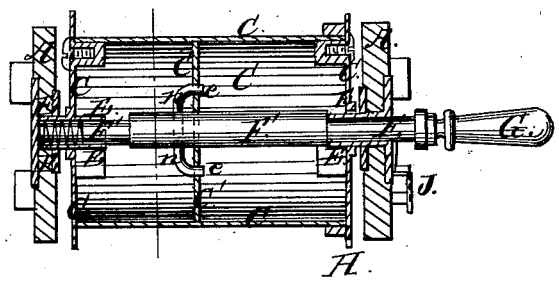
Fig: 4.
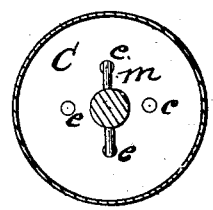
Witnesses
Solon C. Kenon
Chas. A. Pettit
Inventor:
C. F. Woodruff
by Haunt & Co
Att'ys

United States Patent Office.

C. F. WOODRUFF, OF NEWBERN, TENNESSEE.

Letters Patent No. 82,264, dated September 15, 1868.

---

IMPROVEMENT IN WATER-ELEVATORS.

---

The Schedule referred to in these Letters Patent and making part of the same.

---

TO ALL WHOM IT MAY CONCERN:

Be it known that I, C. F. WOODRUFF, of Newbern, in the county of Dyer, and State of Tennessee, have invented a new and improved Water-Elevator; and I do hereby declare that the following is a full, clear, and exact description of the construction and operation of the same, reference being had to the accompanying drawings, making a part of this specification, in which—

Figure 1 is a front elevation.
Figure 2 is an end elevation.
Figure 3 is a horizontal section through the axis of the cylinder.
Figure 4 is a vertical cross-section through the cylinder.

My invention has for its object to improve the construction of my improved water-elevator, patented February 4, 1868, so as to make it simple in construction, and more convenient in operation; and it consists in the construction and combination of the various parts, as hereinafter more fully described.

In the drawings, A represents the well-curb or supporting-frame of the apparatus; D, the rope or chain which raises and lowers the bucket; C, the cylinder around which the rope is wound; F, the shaft of said cylinder, bearing in the frame at $e\ e$; G, the crank attached to the shaft F, outside of the well-curb, by which the cylinder is rotated and the bucket raised; H, a ratchet on one end of the cylinder, and I, a pawl operating in the ratchet H, to prevent the accidental back-action of the machinery.

It will be observed that the bearings $e\ e$ are elongated, being made in the form of tubes, projecting to a considerable extent into the cylinder, and forming, in their interior, a bearing for the shaft F, and on their exterior surface a bearing or spindle, upon which the cylinder C is supported and rotates. It will also be observed that the central portion or main body, $F'$, of the shaft F, is made larger in diameter than the ends or bearing portion of the shaft, and that the shaft, in consequence of this construction, is capable of sliding longitudinally in its bearings and in the cylinder, until the shoulders of the enlarged part, $F'$, come in contact with the inner ends of the tubular bearings $e\ e$, when such sliding motion must stop. It will further be seen, from figs. 3 and 4, that there is a central partition or wall, $C'$, across the interior of the cylinder, through which the shaft F slides, which is provided with several apertures, $c\ c\ c\ c$, and that there is a clutch, $m$, affixed to the shaft, the ends of which, when the shaft is slid to the right, as seen in the front view, and in fig. 3, enter the holes $c\ c$, and so connect the cylinder to the whole shaft F, that the latter cannot be rotated by the crank G, without rotating the cylinder also. When, however, the ends of the clutch are not in the holes $c\ c$, the shaft and cylinder are disconnected, and either can be rotated independently of the other. Ordinarily, the clutch will be held in the holes by the action of a spring, $s$, which presses the shaft F longitudinally to the right, as shown in fig. 3; but by pressing the crank G in towards the curb with force enough to overcome the spring, the clutch will be disengaged from the partition, and the cylinder and shaft disconnected.

J is a stop or hook on the end of the curb, into which the crank can be slipped when the shaft is pressed in far enough to disconnect it from the cylinder, and which will confine the shaft in that position, leaving the cylinder free to run back as soon as the pawl I is disengaged from the ratchet. K is a lever for disengaging the pawl, and L is a hook to hold it in place during the operation of raising water. The lower end of the lever K may be made to act as a brake against the surface of the cylinder, near the ratchet, in order to prevent the cylinder from running back too fast.

The operation of this instrument is exceedingly simple and convenient. By turning the crank in the proper direction, it rotates the cylinder and draws up the bucket. When the latter has reached the mouth of the well, it is emptied, and by simply taking off the pawl, and pressing the crank inward towards the curb, without removing the hand from it, the cylinder is disengaged from the shaft, and the bucket runs back by its own weight. When it has been again filled, it requires no effort of the operator to connect the shaft and cylinder, the spring $s$ performing this function.

Having thus described my invention, what I claim as new, and desire to secure by Letters Patent, is—

1. The cylinder C, constructed with the central partition or wall $C'$, when employed in combination with the sliding shaft F and the tubular bearings $e\ e$, substantially as described.

2. The arrangement of the spring $s$, tubular bearings $e\ e$, shaft F, clutch $m$, partition $C'$, and cylinder C, substantially as described and shown.

To the above specification of my improvement I have signed my hand, this 4th day of May, 1868.

C. F. WOODRUFF.

Witnesses:
CHAS. A. PETTIT,
SOLON C. KEMON.